United States Patent [19]

Sakurai

[11] Patent Number: 4,567,786

[45] Date of Patent: Feb. 4, 1986

[54] MODULAR MULTI-ENGINE THRUST CONTROL ASSEMBLY

[75] Inventor: Seiya Sakurai, Seattle, Wash.

[73] Assignee: The Boeing Company, Seattle, Wash.

[21] Appl. No.: 451,657

[22] PCT Filed: Sep. 30, 1982

[86] PCT No.: PCT/US82/01381

§ 371 Date: Sep. 30, 1982

§ 102(e) Date: Sep. 30, 1982

[87] PCT Pub. No.: WO84/01446

PCT Pub. Date: Apr. 12, 1984

[51] Int. Cl.⁴ .................. G05G 5/02; G05G 7/00; G05G 13/00

[52] U.S. Cl. .................. 74/483 R; 60/39.091; 60/39.281; 74/491; 74/523; 74/526; 74/625; 244/75 R; 244/220

[58] Field of Search .............. 74/469, 483 R, 491, 74/523, 526, 625; 60/39.091, 39.281; 244/75 R, 110 B, 196, 197, 220, 234

[56] References Cited

U.S. PATENT DOCUMENTS

| | | | |
|---|---|---|---|
| 2,407,877 | 9/1946 | Good | 74/483 |
| 2,664,762 | 1/1954 | Morris | 60/39.281 X |
| 2,789,418 | 4/1957 | Machlanski | 60/39.2 |
| 2,945,347 | 7/1960 | Colley | 60/39.281 X |
| 3,034,296 | 5/1962 | Keen et al. | 244/75 X |
| 3,321,921 | 5/1967 | Criffield | 60/235 |
| 3,599,510 | 8/1971 | Scott, Sr. et al. | 244/234 X |
| 3,850,388 | 11/1974 | Olcott et al. | 244/234 X |
| 4,012,015 | 3/1977 | Nelson et al. | 244/220 |

FOREIGN PATENT DOCUMENTS 618389 2/1949 United Kingdom ............ 60/39.091

Primary Examiner—Allan D. Herrmann
Attorney, Agent, or Firm—Hughes & Cassidy

[57] ABSTRACT

A modular thrust control lever assembly for manual pilot control of the forward/idle/reverse thrust operational modes of multiple engine aircraft and including manually manipulable pilot control levers (24L, 24R) each having a fixed lever portion (69L, 69R) and an integral crank (42L, 42R) mounted about a fixed pivot axis (44) and a radially extendable handle portion (85L, 85R and 26L, 26R) with the fixed pivoted lever portions (69L, 69R) and radially extendable handle portions (85L, 85R) being secured together by a slide assembly (70L, 70R) and a lever assembly (71L, 71R) having a roller (64L, 64R) movable in an arcuate slot (66L, 66R); pivotal inhibit means (48L, 48R, and 49L, 49R) for inhibiting motion of the roller (64L, 64R) within the slot (66L, 66R) when the engines are not properly configured; means (31L, 31R, 60L, 60R, 58L, 58R, 55L, 55R) for disengaging said inhibit means when the engines are properly configured; a plurality of resolvers (30L, 30R) of opposite hand and disposed at different distances from the pivot axis (44) of the control levers (24L, 24R) and interconnected to respective ones of the cranks (42L, 42R) by linkage assemblies (29L, 29R) of different lengths; with said control levers (24L, 24R) and associated operating components being mounted within a thin, compact housing (22).

17 Claims, 12 Drawing Figures

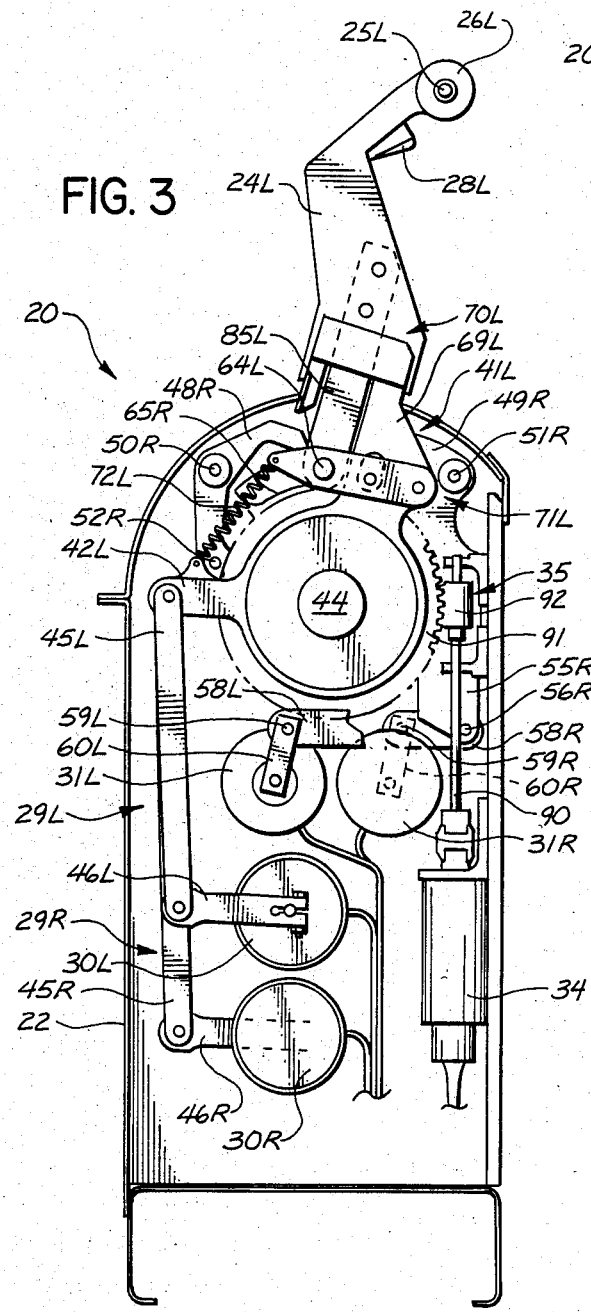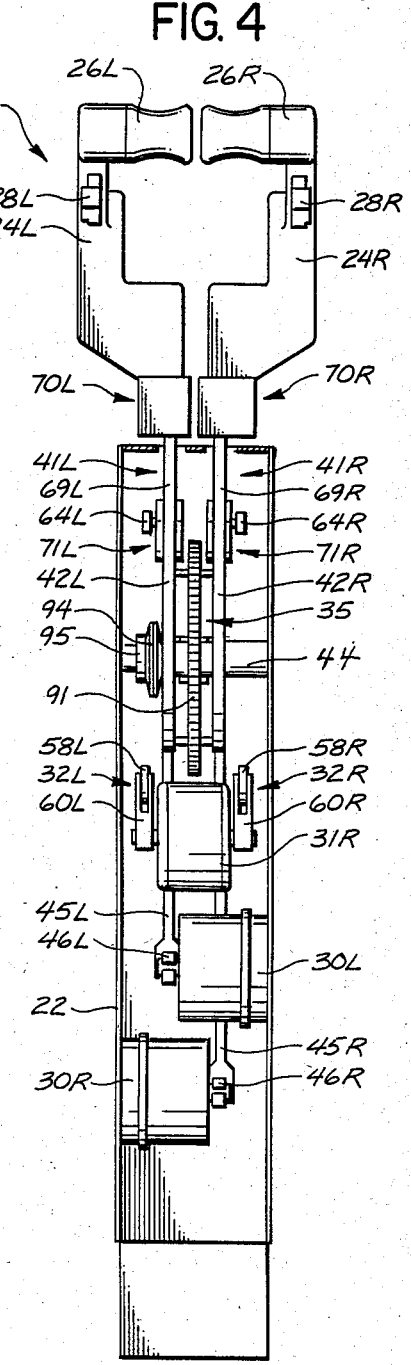

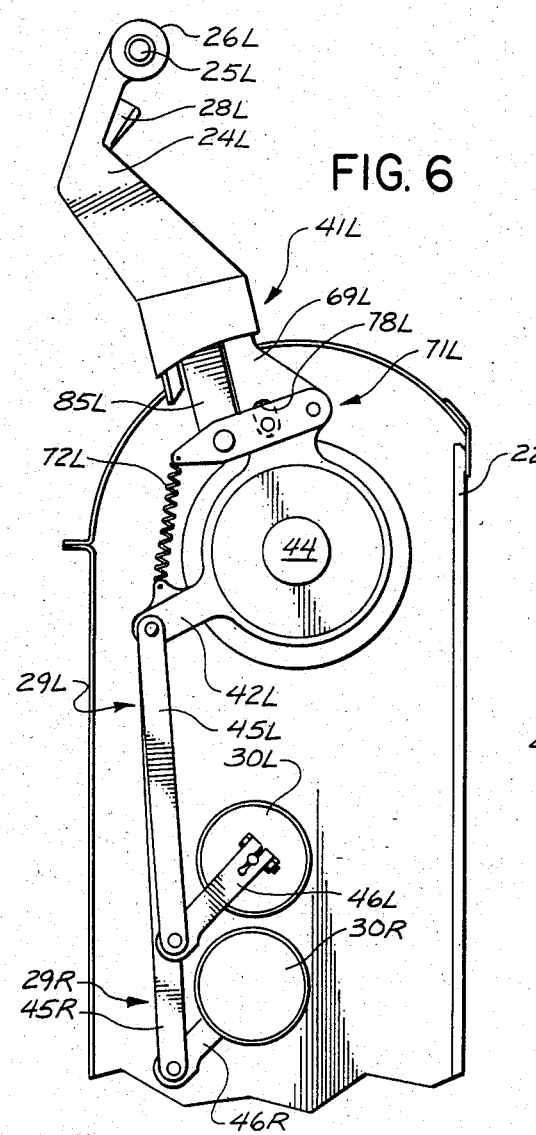
FIG. 6
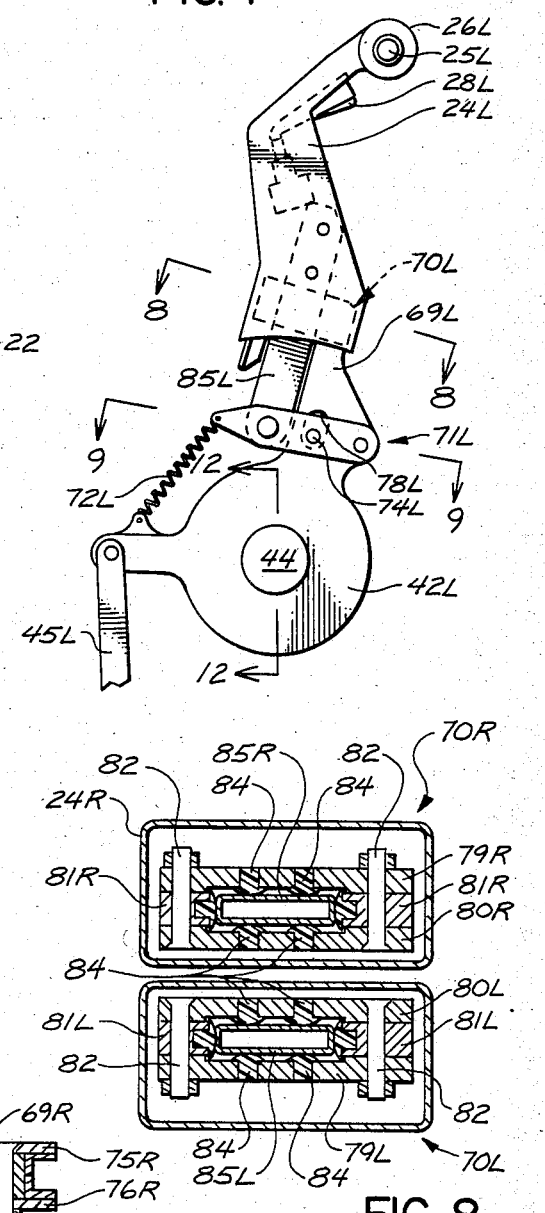
FIG. 7
FIG. 8
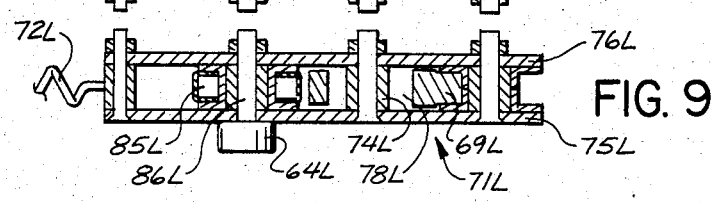
FIG. 9

MODULAR MULTI-ENGINE THRUST CONTROL ASSEMBLY

BACKGROUND OF THE INVENTION

1. Technical Field

The present invention relates generally to thrust control assemblies of the type employed in aircraft for controlling forward, idle and reverse thrust conditions of multi-engine aircraft; and, more particularly, to a simple, compact, modular, multiple engine thrust control assembly of the type wherein manual manipulation by the pilot of multiple side-by-side thrust control levers serves to drive a corresponding number of resolvers in an electric/electronic thrust engine control system. In accordance with the invention, n (wherein "n" may be 2, 3 or 4) manually manipulable pilot operated thrust control levers are mounted in closely adjacent side-by-side relation and are coupled through relatively simple linkage mechanisms of differing dimensions to respective ones of n conventional resolvers with such resolvers being mounted one above the other within a compact, narrow, above-floor housing so as to minimize weight and volume requirements; and, wherein each of the n thrust control levers can be shifted between: (i) intermediate forward and reverse idle positions and (ii) maximum forward or maximum reverse thrust positions; yet, wherein movement from an intermediate idle position to either the forward or reverse thrust position is inhibited until the multiple engines are properly configured for forward thrust on the one hand and reverse thrust on the other. The compact, modular, multiple engine, manually manipulable thrust control assembly further permits of automatic operation of the aircraft engines.

2. Background Art

In most conventional thrust control systems for multi-engine aircraft, manual positioning of multiple throttle controls by the pilot is effected through suitable cables, linkages and mechanical actuators to permit the pilot to throttle the aircraft engines between intermediate idle and full forward or full reverse thrust conditions. However, such conventional mechanical systems require extensive complex linkages and mechanical, electromechanical and/or fluid actuating mechanisms for positioning the engine control elements; and, unfortunately, such mechanisms are relatively heavy, space-consuming, and require extensive maintenance and service. In some instances, the pilot is required to utilize separate manually positionable control levers for establishing the forward and reverse thrust operational modes for each of the multiple engines such, for example, as in the system described in U.S. Pat. No. 3,321,921-Criffield. In other instances, a single control lever may be employed for controlling all operational thrust conditions for a given engine. A typical example of the latter approach is disclosed in U.S. Pat. No. 2,789,418-Machlanski. However, regardless of which prior approach is employed, the various mechanical linkages and drive mechanisms associated with the pilot-operated thrust control levers located in the cockpit are generally quite complex, heavy, and space-consuming.

Recently, serious consideration has been given to employment of electric/electronic engine thrust control systems suitable for use with multiple engine aircraft wherein actuation of the various aircraft controls—e.g., flaps, spoilers, engines, thrust reversers, etc.—is accomplished by manipulating control levers which serve to drive resolvers, switches and similar electric/electronic devices for positioning of such aircraft control elements. The present invention relates to an improved modular thrust control lever assembly for multiple engine aircraft which is characterized by its simplicity and compactness, which is light in weight, and which permits of ease of manufacture, installation and maintenance.

SUMMARY OF THE INVENTION

A modular thrust control lever assembly for manual pilot control of the forward/idle/reverse thrust operational modes of multiple aircraft engines is disclosed which comprises n (where "n"=2, 3 or 4) manually manipulable pilot control levers mounted in a closely adjacent side-by-side array wherein the n levers may be shifted from intermediate forward and reverse idle positions to maximum forward thrusts or maximum reverse thrust positions; yet, wherein movement from any intermediate idle position to either a forward thrust or reverse thrust position is inhibited until such time as the n multiple engines are properly configured for forward or reverse thrust operation, and wherein shifting of the n levers serves to drive n resolvers aligned in a compact, generally linear, narrow array at different distances from the n operating levers through n simple compact linkage mechanisms. The modular pilot actuated control lever assembly further permits of automatic operation under "autopilot" control; and, is characterized by: (i) minimal looseness and freedom from backlash; (ii) compactness; and (iii), ease of manipulation. At the same time, the manually operable control levers are designed such that inadvertent premature shifting thereof into an operational thrust mode is precluded until the engines have been properly configured for such operational mode. Further, the modular assembly of the present invention is characterized by its relatively few moving parts, all of which are contained in a small, low and extremely narrow control housing for above-floor mounting in the aircraft cockpit in a location convenient to the pilot and co-pilot; yet, wherein the sight lines to the aircraft instrument panel are not obstructed.

More specifically, it is a general aim of the present invention to provide a simple, compact, pilot manipulable modular thrust control lever assembly for a multi-engine aircraft which is light in weight, both narrow and low in configuration, and which permits of ease of manufacture, installation and/or maintenance.

A more detailed objective of the invention is the provision of a modular multiple engine thrust control lever assembly which employs n pilot manipulable control levers for controlling respective ones of n engines in both forward and reverse thrust operational modes; wherein the n control levers are positioned in closely adjacent side-by-side relationship; and, wherein the n control levers serve to drive n resolvers and their associated electric/electronic switches and control components through simple drive links which are of different lengths, thereby permitting the n resolvers to be mounted in a compact, narrow, linear array at different distances from the n control levers.

It is a further objective of the invention to provide a modular multiple engine thrust control wherein provision is made for inhibiting movement of the multiple control levers from an idle thrust position until such time as the engines are properly configured for forward and/or reverse thrust operation.

In yet another of its important aspects, it is an object of the invention to provide an improved pivotal control lever assembly including telescopically slidable lever components; yet which is characterized by its stability, minimal looseness and freedom from backlash, and its optimized load handling capabilities.

DESCRIPTION OF THE DRAWINGS

These and other objects and advantages of the present invention will become more readily apparent upon reading the following detailed description and upon reference to the attached drawings, in which:

FIG. 3 is a side elevational view of the modular thrust control assembly shown in FIG. 1, but here illustrating the assembly with the cover removed and with the two thrust control levers positioned in the "forward idle" position;

FIG. 4 is a rear end view of the modular thrust control assembly shown in FIGS. 1 and 3, again illustrating the assembly with the cover removed;

FIG. 6 is a side elevational view similar to FIG. 3, but here illustrating the modular thrust control assembly with parts removed for purposes of clarity and illustrating particularly the position of the operating linkages when the thrust control levers are moved fully forward into a maximum forward thrust position;

FIG. 7 is a fragmentary side elevational view here illustrating details of the lever assembly permitting vertical movement of the control levers between a downward position where the levers can be moved in a forward direction to increase forward thrust and an upper position wherein the levers can be moved rearwardly to increase reverse thrust;

FIG. 8 is a sectional view taken substantially along the line 8—8 in FIG. 7 and illustrating details of the slide mechanism permitting vertical movement of the control levers;

FIG. 9 is a sectional view taken substantially along the line 9—9 in FIG. 7 and illustrating details of the roller and follower mechanism;

Figure 1:
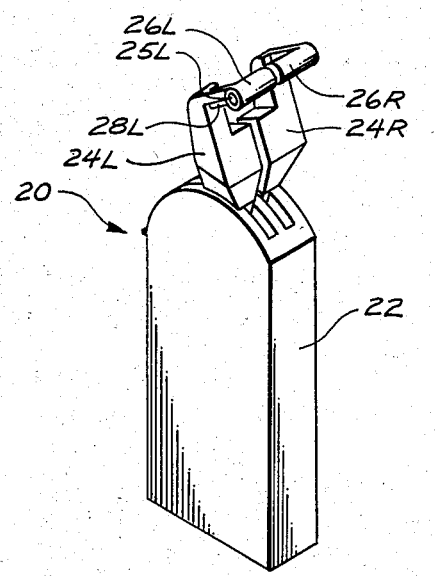
FIG. 1 is a perspective view of a modular thrust control assembly embodying the features of the present invention and here illustrating the invention as applied to a two-engine aircraft installation with the thrust control assembly including a pair of pilot thrust control levers for respectively controlling forward and reverse thrust of the two aircraft engines.

While the invention is susceptible of various modifications and alternative forms, a specific embodiment thereof has been shown by way of example in the drawings and will herein be described in detail. It should be understood, however, that it is not intended to limit the invention to the particular form disclosed but, on the contrary, the intention is to cover all modifications, equivalents and alternatives falling within the spirit and scope of the invention as expressed in the appended claims.

DETAILED DESCRIPTION

Environment Of The Invention

Figure 2:
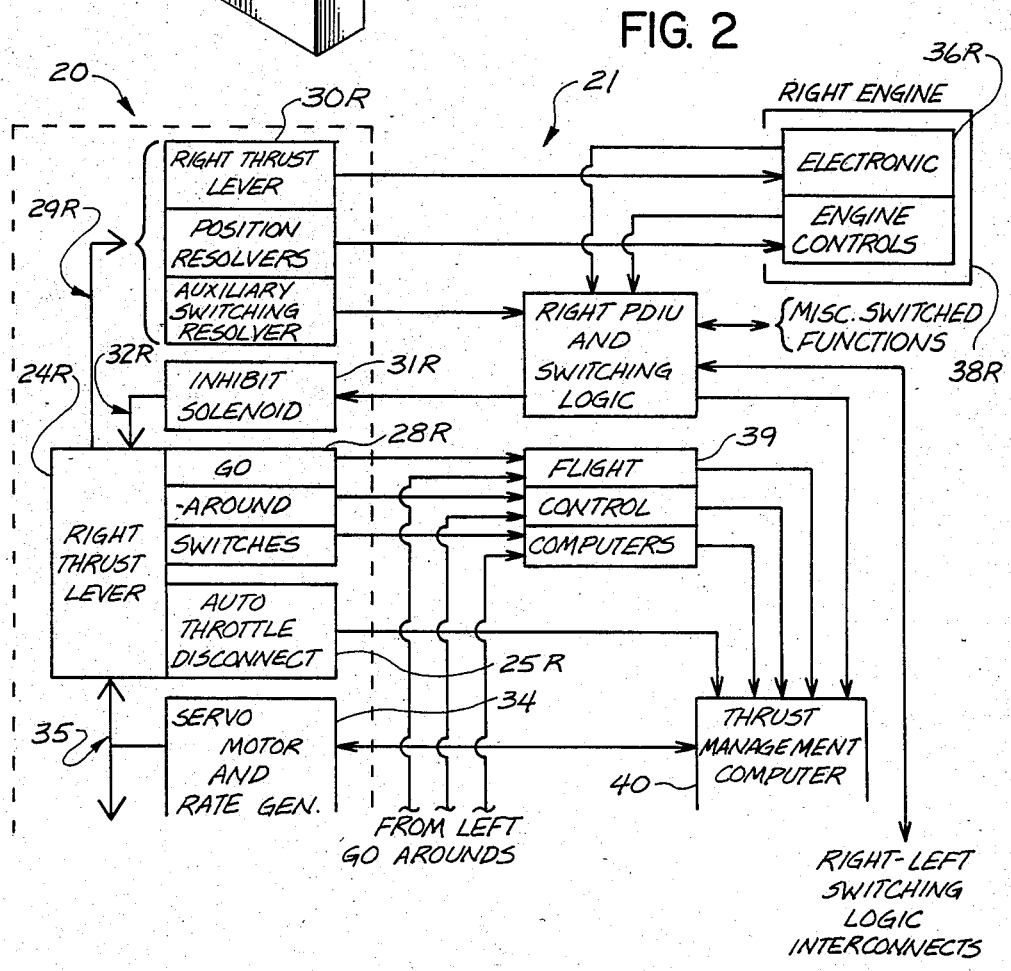
FIG. 2 is a block and line drawing illustrating the various control elements employed for controlling thrust of the right engine in a twin engine aircraft.

Referring first to FIGS. 1 and 2 conjointly, there has been illustrated a compact modular thrust control lever assembly, generally indicated at 20, embodying the features of the present invention; and, illustrating also, in simple block-and-line diagrammatic form, that portion of the electric/electronic engine thrust control system, generally indicated at 21 in FIG. 2, for controlling the thrust operational mode of the right or starboard engine on a twin-engine aircraft. In the exemplary form of the invention herein illustrated and described, the modular thrust control lever assembly 20 is depicted as configured for use with a twin-engine aircraft; and, consequently, the physical components to be described herein are, for the most part, duplicated with respect to right and left control elements for the right and left engines, although certain functionally identical elements for the twin engines differ somewhat in size, shape and/or location. However, to facilitate an understanding of the ensuing description, those left and right control components which are provided for the same functional purpose will be identified by the same reference numerals together with the appropriate designation "L" or "R" to differentiate between a portion of the left engine controls and a like portion of the right engine control.

Thus, referring to FIG. 1, it will be observed that the modular thrust control assembly 20 there illustrated includes an upright housing 22 which may be either floor mounted in the aircraft cockpit or shoulder mounted in the cockpit aisle stand, preferably between the pilot's and co-pilot's seats (not shown), and from which project a pair of identical "mirror image" manually manipulable thrust control levers 24L, 24R. The arrangement is such that the pilot may readily grasp both control levers 24L, 24R with one hand and move them in unison along an arcuate path from an intermediate idle position (such as shown in FIG. 1) either forwardly to increase forward engine thrust or rearwardly to increase reverse thrust. However, as will become apparent from the ensuing description, the twin control levers 24L, 24R and their associated mechanical and electric/electronic control elements are completely independent from one another except when in the "autopilot" mode, thus permitting completely independent control over the operational thrust conditions for the left and right engines. Moreover, as will be apparent upon inspection of FIG. 1, and as will become even more apparent from the ensuing description, although virtually all mechanical linkage assemblies and operating components for controlling forward and reverse thrust of both aircraft engines, excluding computers and purely electric/electronic controls, are physically located within housing 22, nevertheless the physical arrangement of such components permits employment of an extremely small, compact, lightweight assembly 20. Thus, in the illustrative twin engine control assembly here illustrated, it has been possible to position the operational components of the modular assembly 20 so that all such components fit within a housing 22 which is only 3.3 inches in width. Moreover, the depth of the exemplary housing 22 is a fwd/aft direction is only about 8.5 inches, while the overall height of the entire assembly 20, including the control levers 24L, 24R is only on the order of about 27 inches.

While the present invention is primarily directed to the mechanical construction of the modular thrust control assembly 20 shown in FIG. 1, a brief description of a typical arrangement for interfacing such an assembly with an electric/electronic engine thrust control system 21 may facilitate an understanding of the invention. Thus, each of the control levers 24L, 24R includes a lever mounted control switch—viz., an automatic throttle disconnect switch (25L in FIG. 1 and 25R in FIG. 2)—mounted on the outboard end of the respective handle portions 26L, 26R on the control levers, and "Go Around" switches (28L in FIG. 1 and 28R in FIG. 2) mounted on the underside of the operating levers 24L, 24R, respectively. The functions of such switches are completely conventional, well known to those skilled in the art, and unrelated to the present invention; and, consequently, need not be further described in detail. Considering, for the moment, only operation of the right engine, and assuming that the pilot grasps the right handle 26R (FIG. 1) and shifts the right operating lever 24R in either a forward or reverse direction, such motion is transmitted via a linkage assembly indicated diagrammatically at 29R in FIG. 2 to three identical side-by-side synchro assemblies comprising a resolver 30R mounted within housing 22.

As previously indicated, physical movement of the thrust control lever 24R from its intermediate idle position to either a forward or reverse thrust position will be inhibited until such time as the right engine is properly configured for the particular thrust operational mode selected. To this end, an inhibit actuator 31R, which may comprise a motorized actuator or a solenoid, is coupled to the right thrust control lever 24R by a linkage assembly generally indicated at 32R in FIG. 2. To permit automatic control when operating in the "autopilot" mode, a single servo motor 34 is mounted within housing 22 and coupled to both the left and right thrust levers 24L, 24R by a drive assembly generally indicated at 35 in FIG. 2.

Thus, the arrangement is such that pilot manipulation of the right control lever 24R will, unless inhibited, drive the right position resolver 30R for conveying control signals to the electronic engine controls 36R for the right engine indicated diagrammatically at 38R. Conventional flight control computers 39 and a thrust management computer 40 are provided for automatic in-flight operation. Although not illustrated in FIG. 2, those skilled in the art will appreciate that the electric/electronic engine thrust control system for interfacing the left thrust control lever 24L (FIG. 1) with the left engine (not shown) would be identical to the system 21 illustrated in FIG. 2 for controlling the right engine 38R.

Forward Thrust Control

With the foregoing generalized overall system description in mind, the physical operation and location of those components employed with the present invention to drive the resolvers 30L, 30R will be described below, first with particular reference to FIGS. 3 and 4 conjointly. Thus, as here shown, it will be noted that the control levers 24L, 24R are respectively coupled by composite slide/lever assemblies, generally indicated at 41L, 41R to respective ones of a pair of cranks 42L, 42R mounted for pivotal movement about a shaft 44 mounted on, and extending transversely of, the housing 22. Crank 42L, together with links 45L and 46L, defines the linkage assembly 29L (FIGS. 2 and 3) used to drive resolver 30L; while crank 42R, together with link 45R (which is appreciably longer than link 45L, as is apparent in FIG. 3) and link 46R, define the linkage assembly 29R for driving resolver 30R.

In operation and assuming, for the moment, that forward movement of the thrust control levers 24L, 24R is not inhibited, it will be apparent that as the pilot moves the control levers 24L, 24R from the forward idle position shown in FIG. 3 in a forward direction (i.e., to the left as viewed in FIG. 3), cranks 42L, 42R will pivot about shaft 44 in a counterclockwise direction as viewed in the drawing, causing links 45L, 45R to move downwardly, and thus pivoting links 46L, 46R in a counterclockwise direction and driving resolvers 30L, 30R through rotational angles proportional to the rotational angles through which the control levers 24L, 24R are moved. The degree of angular rotation through which the resolvers are driven is determinative of the electrical output signals delivered to the electronic engine controls—e.g., to the control 36R shown in FIG. 2. When the pilot has shifted the control levers 24L, 24R to their fully forward maximum forward thrust position, the levers and linkage assemblies are in the position shown in FIG. 6 and the engines are operating at maximum forward thrust.

In keeping with the present invention, it will be noted that upon inspection of FIG. 4 that the resolvers 30L, 30R are mounted on the housing 22 one above the other and in facing relation—that is, the resolvers are of opposite hand. Such an arrangement, together with the generally vertical disposition of the different length links 45L, 45R allows the overall control thrust lever assembly 20 and housing 22 to be designed with the extremely narrow dimension of 3.3 inches as previously described.

Forward/Reverse Thrust Inhibit

Those skilled in the art will appreciate that whenever a pilot wishes to reconfigure the thrust operational mode between a forward thrust operational mode and a reverse thrust operational mode, it is essential that certain engine controls including, for exammple, the thrust reversers (not shown), be repositioned. As a consequence, assuming that the aircraft is in the forward thrust operational mode and the pilot wishes to reverse thrust, it is necessary that such engine controls and thrust reversers associated with the engines be moved into their thrust reversal position prior to applying maximum reverse thrust. For this reason, provision is made with the present invention for inhibiting movement of the control levers 24L, 24R to the full reverse thrust position until the engines have been properly configured. Conversely, when in the reverse thrust operational mode, provision is made for inhibiting forward movement of the control levers 24L, 24R until such time as the engines have been reconfigured.

Figure 5:
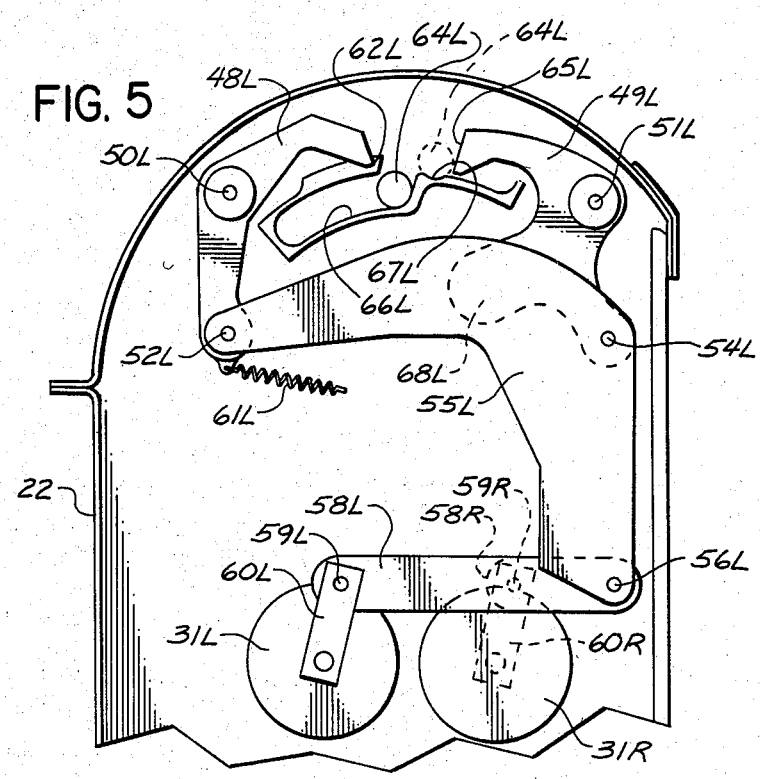
FIG. 5 is an enlarged side elevational view of the modular thrust control assembly, with parts removed for purposes of clarity, here particularly illustrating the linkages employed for inhibiting manual shifting of the operating levers in the forward and reverse directions, with the linkages here being shown in a typical and normal "forward idle" position wherein reverse movement of the control levers is inhibited while forward movement of the control levers is not inhibited.

To this end, and in accordance with another important aspect of the present invention, a forward/reverse thrust inhibiting system has been provided which, as best shown in FIG. 5, includes a pair of rocker arms 48L, 49L respectively pivoted at 50L, 51L to housing 22—it being understood that a similar pair of rocker arms (not shown), as well as other inhibit components described below, are also provided for forward/reverse inhibition of the right engine thrust control lever 24R (FIG. 1). The lower ends of the rocker arms 48L, 49L are pivotally connected at 52L, 54L, respectively, to opposite ends of the generally horizontal leg of an L-shaped link 55L. Link 55L is, in turn, pivoted at 56L adjacent the lower end of its vertical leg to link 58L which extends horizontally and is pivoted at 59L adjacent its forward end to crank 60L driven by the left motorized inhibit actuator 31L. The rocker arms 48L, 49L, links 55L, 58L, and crank 60L are all biased to the position shown in FIG. 5 by means of a spring 61L; and, in this position, the two rocker arms 48L, 49L are biased in a counterclockwise direction as viewed in FIG. 5 about their respective pivots 50L, 51L. As a consequence, the face 62L of rocker arm 48L is raised out of the path of movement of a roller 64L carried on control lever 24L (FIG. 3); while, at the same time, the face 65L on rocker arm 49L is depressed into the path of rearward movement of roller 64L. Therefore, in this position the pilot is free to advance the throttle control lever 24L to the full maximum forward thrust position shown in FIG. 6 and, during such movement, roller 64L moves freely in an arcuate guide slot 66L.

Assuming, however, that the pilot wishes to reconfigure the operational thrust mode of the aircraft for reverse thrust operation, he will then raise the control lever 24L (FIG. 3) slightly and begin to move the lever rearwardly. As the control lever 24L is moved in this fashion, roller 64L moves from the solid line position there shown in FIG. 5 to the dotted line position shown where it is seated in a detent 67L and engages the face 65L of the still depressed rocker arm 49L. Further rearward movement of the control lever 24L is, therefore, inhibited. However, the foregoing action serves to initiate electric/electronic functions in the electric/electronic engine thrust control system 21 (FIG. 2) which result in energization of the motorized inhibit actuator 31L. When the latter is energized, crank 60L is rotated in a counterclockwise direction as viewed in FIG. 5; and, through link 58L, causes the L-shaped link 55L to move to the left, thereby pivoting rocker arms 48L and 49L in a clockwise direction about their respective pivots 50L, 51L from the position shown in FIG. 5 to that shown in FIG. 10. In this position, the face 62L on rocker arm 48L drops down to inhibit forward motion of roller 64L and thereby inhibiting forward movement of the control lever 24L (FIG. 3) to which roller 64L is attached. At the same time, clockwise movement of rocker arm 49L raises its face 65L out of contact with the roller 64L and permits the pilot to move the control lever 24L to its full rearward maximum reverse thrust position. When the pilot returns the control lever 24L to the forward idle thrust position shown in FIGS. 3 and 5, the actuator 31L is de-energized and spring 61L serves to return the rocker arms 48L, 49L, links 55L, 58L, and crank 60L to the position shown in FIG. 5, thereby again inhibiting reverse thrust movement of control lever 24L and enabling forward thrust movement thereof.

In carrying out this aspect of the invention, the faces 62L, 65L of rocker arms 48L, 49L, respectively, are arcuate and swing from centers slightly offset from the rocker arm pivot centerlines in directions which orient the faces 62L, 65L so that pressure of the roller 64L against the faces tends to cause each rocker arm to move out of the way when forces are exerted thereon by the roller, thereby serving to assist the motorized inhibit actuators 31L, 31R and tending to counteract friction loads. Further, as as best shown in FIG. 5, rocker arm 49L is provided with a protuberance or counterweight 68L which functions to restore the inhibit mechanism to the reverse inhibit state shown in FIG. 5 in those instances when the spring 61L fails.

Composite Slide/Lever Assemblies 41L, 41R

In carrying out the present invention, provision is made for enabling vertical translation of the control levers 24L, 24R when moving between forward thrust and reverse thrust operational modes as described above; yet, wherein the modular control assembly 20: (i) is characterized by its stability; (ii) minimal looseness; and (iii), its ability to smoothly handle the various loads to which the assembly 20 is subjected in operation. To accomplish this, the control levers 24L, 24R are respectively coupled to the upwardly projecting arms 69L, 69R on cranks 42L, 42R by means of slide assemblies, generally indicated at 70L, 70R (best shown in FIGS. 7 and 8) and vertically spaced lever assemblies, generally indicated at 71L, 71R (best shown in FIGS. 7 and 9). Springs—for example, spring 72L shown in FIGS. 3 and 7—are provided for biasing the control levers 24L, 24R to their downward positions. The degree of permissible vertical translation for the control levers 24L, 24R is limited by spacer bushings 74L, 74R bolted between links 75L, 76L and 75R, 76R, as best shown by reference to FIGS. 7 and 9 conjointly. Thus, the arrangement is such that the spacer bushings 74L, 74R extend through vertically oriented oblong slots 78L, 78R formed in arms 60L, 69R and are free for vertical translation within the oblong slots with the degree of vertical translation being limited by the length of the slots.

Considering next FIGS. 7 and 8 conjointly, it will be observed that the slide mechanisms 70L, 70R respectively include sideplates 79L, 80L and 79R, 80R which are spaced apart by spacers 81L, 81R and securely bolted together by means of threaded fasteners 82. Plastic buttons 84 mounted in the sideplates 79L, 80L and 79R, 80R are in sliding engagement with respect to handle links 85L, 85R which pass through the spaced sideplates and are secured at their upper ends to respective ones of the control levers 24L, 24R and at their lower ends to the links 75L, 76L and 75R, 76R by means of fastener elements 86L, 86R which respectively carry at their outboard ends the rollers 64L, 64R.

Thus, the arrangement is such that when the pilot wishes to reconfigure the engines for reverse thrust operation, he grasps the handles 26L, 26R of the control levers 24L, 24R and raises such levers upwardly until the spacer bushings 74L, 74R are engaged with the upper ends of the slots 78L, 78R and, thereafter, he moves the levers 24L, 24R slightly aft until the rollers 64L, 64R engage the faces 65L, 65R of the rocker arms 49L, 49R. During this motion, the rollers 64L, 64R carried on the link assemblies 71L, 71R move upwardly from the solid line position shown in FIG. 5 to the dotted line position shown in FIG. 5. Once the motorized inhibit actuators 31L, 31R have been energized by such movement in the manner previously described, the rocker arms 48L, 49L are shifted from the position shown in FIG. 5 to that shown in FIG. 10, thereby enabling further rearward movement of the thrust control levers 24L, 24R. When the pilot returns the thrust control levers 24L, 24R to an intermediate idle position, the springs 72L, 72R serve to restore the slide assemblies 70L, 70R and lever assemblies 71L, 71R to their lowermost positions shown in FIG. 7 with the rollers 64L, 64R in the forward idle thrust position shown in solid lines in FIG. 5, thus de-energizing the motorized inhibit actuators 31L, 31R in the manner previously described and shifting the rocker arms 48L, 49L from the position shown in FIG. 10 to that shown in FIG. 5.

It has been found in the practice of the present invention that the use of the combination of slide assemblies 70L, 70R and lever assemblies 71L, 71R provides real advantages in terms of minimizing looseness in the connection of the control levers 24L, 24R to the operating linkages while, at the same time, providing the necessary load handling capabilities in the areas where loads are primarily concentrated. Thus, the slide assemblies 70L, 70R effectively limit sidewise motion of the control levers 24L, 24R and keep fore and aft looseness to a minimum; yet, they do not introduce friction or reaction loads in a radial direction due to tangential loads. On the other hand, the lever assemblies 71L, 71R which carry rollers 64L, 64R engageable with the forward and reverse inhibit mechanisms are subjected to about four times the loads applied by the pilot whenever the rollers engage the stop faces 62L, 62R and 65L, 65R on the rocker arms 48L, 48R and 49L, 49R. It has been found that the use of lever assemblies 71L, 71R permits such loads to be handled with greater smoothness and ease than could slide assemblies if positioned at the same location.

Reverse Thrust Control

Figure 10:
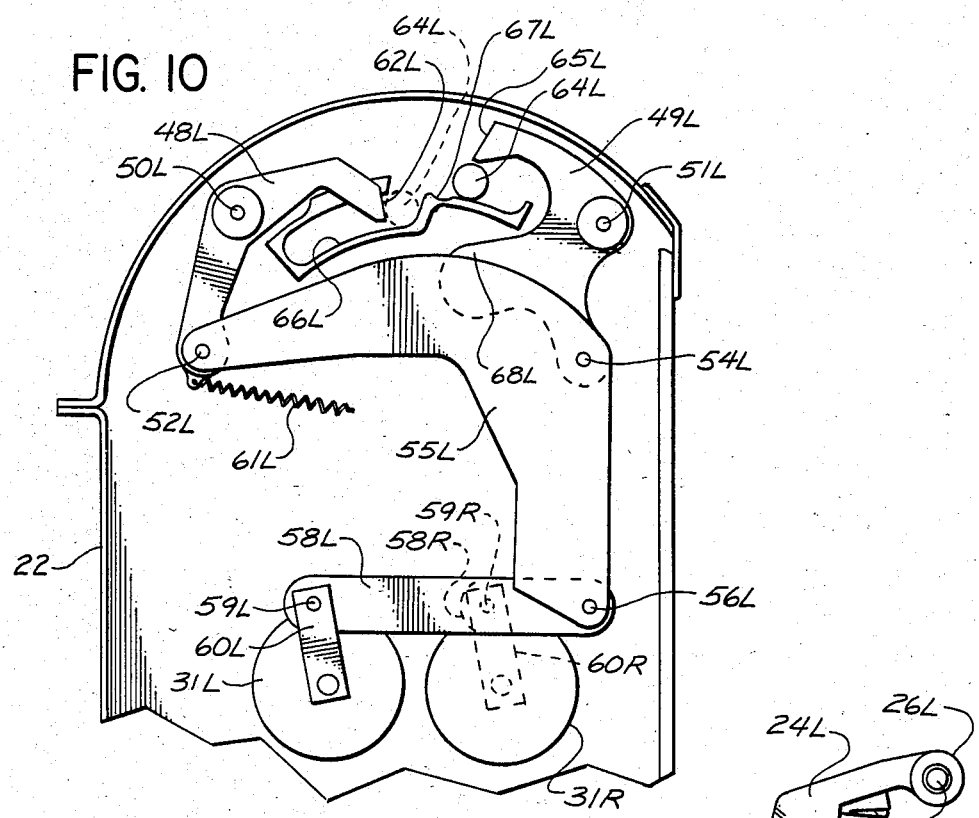
FIG. 10 is a side elevational view similar to FIG. 5, but here illustrating the inhibit mechanism positioned to inhibit forward movement of the thrust control operating levers while permitting reverse movement thereof.
Figure 11:
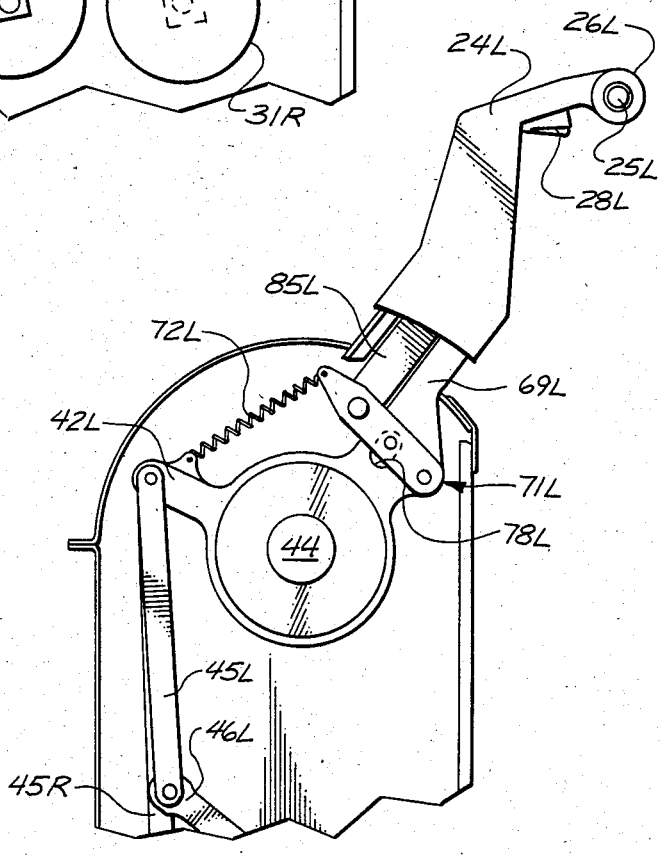
FIG. 11 is a side elevational view similar to FIG. 6, but here illustrating the operating control levers and associated control linkages with the levers in their fully rearward position for establishing maximum reverse thrust; and, FIG. 12 is a sectional view taken substantially along the line 12—12 in FIG. 7 and illustrating details of the friction drive mechanism employed when shifting the control levers during automatic operation—i.e., when the "autopilot" is on and the engines are configured for in-flight forward thrust operation and are automatically controlled by suitable "on-board" computer inputs.

Having in mind the foregoing description of the operation of the forward/reverse thrust inhibit mechanism and the composite slide/lever assemblies 41L, 41R which permit limited vertical translation of the control levers 24L, 24R, and considering FIGS. 3, 5, 10 and 11 conjointly, there will be briefly described the motion of the control linkages as the pilot shifts the control levers 24L, 24R from the forward idle thrust position (FIGS. 3 and 5), to the reverse idle thrust position (the dotted line position of roller 64L shown in FIG. 5), and thence rearwardly towards the maximum reverse thrust position (FIGS. 10 and 11). Thus, the pilot first grasps the handles 26L, 26R of control levers 24L, 24R and raises the levers upwardly to the limit position defined by the spacer bushings 74L, 74R and the upper ends of the oblong slots 78L, 78R, moving the control levers rearwardly slightly to the reverse idle thrust position wherein the rollers 64L, 64R on the forward ends of lever assembly 71L, 71R are received within the reverse thrust detents 67L, 67R—i.e., the dotted line position for roller 64L shown in FIG. 5. Upon energization of the motorized inhibit actuators 31L, 31R, the rocker arms 48L, 48R and 49L, 49R are pivoted in a clockwise direction as viewed in FIGS. 5 and 10 in the manner previously described, shifting from the reverse inhibit position shown in FIG. 5 to the forward inhibit position shown in FIG. 10. Thereafter, the pilot may move the control levers 24L, 24R fully to the maximum reverse thrust position shown in FIG. 11, thus pivoting the cranks 42L, 42R (FIGS. 3, 4 and 11) from the position shown in FIG. 3 to that shown in FIG. 11; raising the links 45L, 45R; and, thereby pivoting the links 46L, 46R in a clockwise direction as viewed in FIG. 3 so as to drive the resolvers 30L, 30R through a rotational angle proportional to the degree of rearward movement of the control levers 24L, 24R.

Automatic Operation

Figure 12:
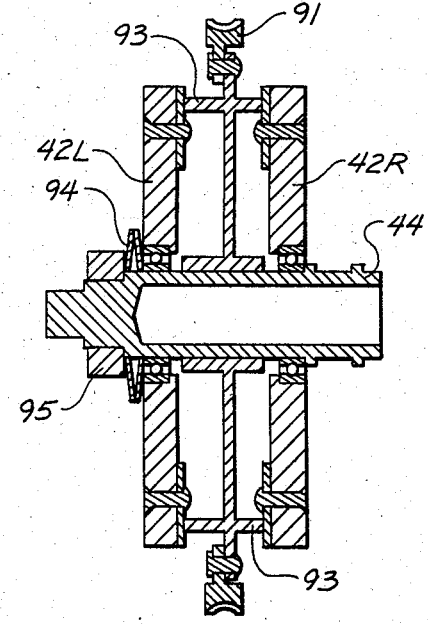

Referring now to FIGS. 3, 4, and 12 conjointly, it will be noted that the servo motor 34 is coupled by a shaft 90 to a worm gear 91 by means of a worm 92. Suitable friction devices 93 are interposed between worm gear 91 and the inner faces of the cranks 42L, 42R. The entire assembly is axially preloaded by means of Belleville washers 94 which serve to apply friction loading against the cranks 42L, 42R, friction devices 93, and worm gear 91. A nut 95 is provided for adjusting the spring force transmitted by Belleville washer 94. As a consequence of the foregoing construction, when the aircraft is being operated in the "autopilot" mode, suitable control inputs are directed from the thrust management computer 40 (FIG. 2) to the servo motor 34 and its rate generator, thereby automatically moving the control levers 24L, 24R when the engines are configured for forward thrust operation. Of course, those skilled in the art will appreciate that the automatic control features discussed above are applicable only to forward thrust operation.

Those skilled in the art will appreciate that there has been herein described a simple, lightweight, compact, modular thrust control assembly for multi-engine aircraft which is characterized by its: (i) simplicity; (ii) stability; (iii) ease of manufacture, assembly and installation; (iv) ease of maintenance and servicing; and, (v) which permits of smooth, effortless, virtually foolproof operation. The arrangement of simple different length linkage mechanisms between the control levers and the resolvers, and the positioning of the resolvers in and up/down facing relation of resolvers of opposite hand enable the control assembly to be made in extremely compact thin form; the forward/reverse inhibit mechanisms render the system virtually foolproof; and, the composite slide/lever assemblies enhance stability, minimize loose play and backlash, and provide optimized load handling capabilities. Moreover, the foregoing construction eliminates the need for expensive, heavy, space consuming and failure-prone mechanical linkages and actuating mechanisms of the type heretofore used to interface the thrust control levers in the aircraft cockpit with remote engine thrust control elements such as thrust reversers.

I claim as my invention:

1. A thin, compact, modular thrust control lever assembly for controlling forward/reverse thrust generated by a plurality of engines in a multi-engine aircraft and of the type including an electric/electronic engine thrust control system comprising, in combination:
   (a) a thin, upright housing;
   (b) a plurality of control lever assemblies pivotally mounted within said housing for fore and aft pivotal movement about a transverse pivot axis, each of said plurality of control lever assemblies including a fixed lever portion mounted for pivotal movement about said pivot axis and a radially extendable handle portion movably secured to said fixed lever portion with freedom for movement relative thereto;

(c) means defining a plurality of slide assemblies respectively secured to said fixed lever portion of each of said plurality of control lever assemblies and surrounding said radially extending handle portion of each of said control lever assemblies, each of said plurality of slide assemblies defining bearing surfaces slidably engaged with said radially extending handle portion of each of said control lever assemblies for limiting sidewise movement of said control lever assemblies and for minimizing fore and aft looseness between said fixed lever portion and said radially extending handle portion of each of said control lever assemblies;

(d) means defining a plurality of lever assemblies pivotally secured at one end to respective ones of each of said fixed lever portions and pivotally secured at the opposite end to respective ones of each of said radially extendable handle portions;

(e) a plurality of guide means mounted in said housing and lying in a fore and aft vertical plane adjacent each of said plurality of control lever assemblies, each of said guide means including a continuous fore and aft arcuate slot having a first arcuate slot segment disposed at a first radial distance from said pivot axis and a second arcuate slot segment disposed at a second radial distance from said pivot axis with the aft end of said first arcuate slot segment being jointed to the forward end of said second arcuate slot segment;

(f) laterally extending roller means formed on each of said plurality of lever assemblies and extending into respective ones said continuous fore and aft arcuate slots formed in said plurality of guide means;

(g) a plurality of resolvers mounted in said housing for generating electrical output signals proportional to the angle through which said plurality of control lever assemblies are pivoted and which are indicative of the direction of such pivotal movement, said plurality of resolvers being mounted at different distances from said pivot axis;

(h) a plurality of link assemblies coupling respective ones of said plurality of control lever assemblies to said plurality of resolvers for driving said resolvers through rotational angles proportional to the angles through which said control lever assemblies are pivoted and in a direction indicative of fore or aft pivotal motion thereof;

(i) movable inhibit means normally mounted in the path of movement of each of said control lever assemblies for normally inhibiting movement of said roller means within one of said first and second arcuate slot segments when said radially extended handle portion is moved relative to said fixed lever portion to shift said roller means from the other of said first and second arcuate slot segments to said one arcuate slot segment;

(j) said electric/electronic engine thrust control system including means for reconfiguring the thrust controls of respective ones of said plurality of engines upon radial extension of said handle portion of each of said control lever assemblies relative to said fixed lever portion thereof and shifting of the associated one of said roller means radially from the other said arcuate slot segments to said one arcuate slot segment and for generating output signals indicative of reconfiguration of said engine thrust conditions; and, (k) means responsive to said output signals for shifting said inhibit means out of the path of movement of said roller means in said one arcuate slot segment so as to permit freedom of movement of said control lever means through a pivotal angle defined by the fore and aft extent of said one arcuate slot segment.

2. A thin, compact, modular thrust control lever assembly for controlling forward/reverse thrust generated by a plurality of engines in a multi-engine aircraft comprising, in combination:

(a) a thin, upright housing;

(b) a plurality of control lever assemblies pivotally mounted within said housing for fore and aft pivotal movement about a transverse pivot axis;

(c) a plurality of resolvers mounted in said housing for generating electrical output signals proportional to the angle through which said plurality of control lever assemblies are pivoted and which are indicative of the direction of such pivotal movement, said plurality of resolvers being mounted at different distances from said pivot axis; and, (d) a plurality of link assemblies for coupling respective ones of said plurality of control lever assemblies to respective different ones of said plurality of resolvers for driving said resolvers through rotational angles proportional to the angles through which said control lever assemblies are pivoted and in an direction indicative of fore or aft pivotal motion thereof.

3. A modular thrust control lever assembly as set forth in claim 2 wherein said plurality of resolvers are of opposite hand and are mounted in said housing one above the other and in facing relation.

4. A modular thrust control lever assembly as set forth in claims 2 or 3 wherein each of said plurality of control lever assemblies includes a fixed lever portion defining a crank mounted for pivotal movement about said pivot axis, and wherein said link assemblies each include a first link drivingly coupled to respective ones of said resolvers and a second link for connecting respective ones of said cranks to respective different ones of said second links, said second links having an effective length substantially equal to the distance between said pivot axis and the one of said resolvers with which it is coupled.

5. A modular thrust control lever assembly as set forth in claims 2 or 3 wherein each of said plurality of control lever assemblies includes means for inhibiting pivotal movement thereof into at least one of a forward thrust position and a reverse thrust position when the associated one of said aircraft engines is not configured to generate thrust in that direction, and means for disabling said inhibiting means when said associated engine is configured to generate thrust in that direction.

6. A modular thrust control lever assembly as set forth in claims 2 or 3 wherein each of said plurality of control lever assemblies includes a fixed lever portion defining a crank mounted for pivotal movement about said pivot axis and a radially extendible handle portion mounted on said fixed lever position with freedom for radial movement with respect thereto, and means for movably securing said handle and lever portion together with freedom for relative radial translation and restrained from relative transverse movement and relative fore and aft movement.

7. A modular thrust control lever assembly as set forth in claims 2 or 3 further including means for automatically pivoting said plurality of control lever assemblies in unison.

8. A thrust control lever assembly for controlling forward/reverse thrust generated by an aircraft engine comprising, in combination:
 (a) a housing;
 (b) a control lever assembly mounted in said housing for fore and aft pivotal movement about a pivot axis extending transversely of said housing, said control lever assembly including a fixed lever portion mounted for pivotal movement about said pivot axis and a radially extending handle portion mounted on said fixed lever portion with freedom for movement with respect thereto;
 (c) means defining a slide assembly secured to said fixed lever portion and surrounding said radially extending handle portion, said slide assembly defining means including bearing surfaces slidably engaged with said radially extendable handle portion for limiting sidewise movement of said control lever assembly and for minimizing fore and aft looseness between said fixed lever portion and said radially extending handle portion;
 (d) means defining a lever assembly pivotally secured at one end to said fixed lever portion and pivotally secured at its opposite end to said radially extending handle portion, said lever assembly including laterally extending roller means mounted thereon; and,
 (e) guide means mounted in said housing having a first arcuate slot disposed at a first radial distance from said pivot axis and a second arcuate slot disposed at a second radial distance from said pivot axis with said first and second slots lying in a fore-/aft vertical plane and being joined together at the aft end of one slot and the forward end of the other slot so as to form a single continuous arcuate slot having a first arcuate slot segment at said first radial distance and a second arcuate slot segment at said second radial distance and positioned to receive said laterally extending roller means whereby pivotal movement of said control lever assembly about said pivot axis from a first position where said roller means is received within said first arcuate slot segment to a second position where said roller means is received within said second arcuate slot segment is accomplished by radial translation of said radially extendable handle portion relative to said fixed lever portion.

9. A thrust control lever assembly as set forth im claim 8 wherein said roller means is coaxial with said pivotal connection between said lever assembly and said radially extending handle portion.

10. A thrust control lever assembly as set forth in claims 8 or 9 wherein means are provided for limiting the extent of relative radial movement between said lever and handle portions.

11. A thrust control lever assembly as set forth in claims 8 or 9 wherein said lever assembly includes first and second spaced parallel links pivotally mounted on opposite sides of said lever portion, said lever portion defining a vertically oriented oblong slot extending therethrough, and spacer means passing through said slot and secured to said first and second links for limiting relative movement between said lever and handle portions.

12. A thrust control lever assembly as set forth in claims 8 or 9 wherein the aft end of said first arcuate slot defines a forward idle thrust position for said control lever assembly, and the forward end of said second slot defines a reverse idle thrust position for said control lever assembly, and means are provided for inhibiting movement of said control lever assembly from said reverse idle thrust position with said roller means traversing said second slot whenever said engine is configured for other than reverse thrust operation.

13. A thrust control lever assembly as set forth in claims 8 or 9 wherein the aft end of said first arcuate slot defines a forward idle thrust position for said control lever assembly, and the forward end of said second slot defines a reverse idle thrust position for said control lever assembly, and means are provided for inhibiting movement of said control lever assembly from said forward idle thrust position with said roller means traversing said first slot whenever said engine is configured for other than forward thrust operation.

14. A thrust control lever assembly as set forth in claims 8 or 9 wherein the aft end of said first arcuate slot defines a forward idle thrust position for said control lever assembly, and the forward end of said second slot defines a reverse idle thrust position for said control lever assembly, means are provided for inhibiting movement of said control lever assembly from said forward idle thrust position with said roller means traversing said first slot whenever said engine is configured for other than forward thrust operation, and means are provided for inhibiting movement of said control lever assembly from said forward idle thrust position with said roller means traversing said first slot whenever said engine is configured for other than forward thrust operation.

15. In a modular thrust control lever assembly for controlling forward/reverse thrust generated by an aircraft engine and of the type including an electric/electronic engine thrust control system, an inhibit mechanism for preventing inadverent or premature establishment of at least one of forward and reverse engine thrust comprising, in combination:
 (a) housing;
 (b) a control lever assembly pivotally mounted within said housing for fore and aft pivotal movement in single vertical plane, said control lever assembly including laterally projecting roller means mounted thereon and being pivotable between an intermediate forward idle thrust position and a maximum forward thrust limit position and between an intermediate reverse idle thrust position and a maximum reverse thrust limit position;
 (c) movable inhibit means normally mounted in the path of movement of said laterally projecting roller means on said control lever assembly between at least one of the maximum thrust limit positions of said assembly and the adjacent intermediate idle thrust position, said movable inhibit means being cooperatively engagable with said laterally projecting roller means for preventing movement of said control lever assembly from said adjacent intermediate idle thrust position to said at least one maximum limit thrust position when the engine controlled thereby is not properly configured for the particular thrust condition to which said control lever assembly is being shifted;

(d) said electric/electronic engine thrust control system including means for reconfiguring the thrust controls of said engine upon movement of said thrust control lever assembly to said adjacent intermediate idle thrust position and for generating an output signal indicative of reconfiguration of said engine thrust conditions; and (e) means responsive to said output signal for shifting said inhibit means out of the path of movement of said control lever assembly from said adjacent thrust idle position to said one maximum thrust limit position whereby the cooperative engagement between said inhibit means and said laterally projecting roller means on said control lever assembly readily permits of ease of shifting said inhibit means under all operating conditions.

16. An inhibit mechanism for a modular thrust control lever assembly as set forth in claim 15 wherein said inhibit means is operative to prevent movement of said control lever means from said intermediate reverse idle thrust position towards said maximum reverse thrust limit position under all operational conditions other than when said engine is configured for reverse thrust generation.

17. An inhibit mechanism for a modular thrust control lever assembly as set forth in claims 15 or 16 wherein said inhibit means is operative to prevent movement of said control lever means from said intermediate forward idle thrust position towards said maximum forward thrust limit position under all operational conditions other than when said engine is configured for forward thrust generation.

* * * * *